US008498656B2

(12) United States Patent
Mujtaba et al.

(10) Patent No.: US 8,498,656 B2
(45) Date of Patent: Jul. 30, 2013

(54) ELECTRONIC DEVICE WITH IDLE MODE ANTENNA SWITCHING

(75) Inventors: Syed A. Mujtaba, Santa Clara, CA (US); Kee-Bong Song, Santa Clara, CA (US); Youngjae Kim, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 214 days.

(21) Appl. No.: 13/098,947

(22) Filed: May 2, 2011

(65) Prior Publication Data

US 2012/0282982 A1 Nov. 8, 2012

(51) Int. Cl.
*H04W 68/00* (2009.01)
(52) U.S. Cl.
USPC ........................................................ 455/458
(58) Field of Classification Search
USPC ........................................................ 455/458
See application file for complete search history.

(56) References Cited

U.S. PATENT DOCUMENTS

| | | | |
|---|---|---|---|
| 5,239,306 A | 8/1993 | Siwiak et al. | |
| 5,430,769 A | 7/1995 | Patsiokas et al. | |
| 5,530,926 A * | 6/1996 | Rozanski | 455/277.2 |
| 6,009,307 A | 12/1999 | Granata et al. | |
| 6,009,310 A * | 12/1999 | Motohashi | 340/7.43 |
| 6,023,615 A * | 2/2000 | Bruckert et al. | 348/14.08 |
| 6,778,815 B1 * | 8/2004 | Enoki | 455/277.2 |
| 7,616,158 B2 | 11/2009 | Mak et al. | |
| 7,701,410 B2 | 4/2010 | Li et al. | |
| 7,711,076 B2 * | 5/2010 | Cho | 375/347 |
| 7,877,067 B2 * | 1/2011 | Hwang et al. | 455/132 |
| 7,929,921 B2 * | 4/2011 | Love et al. | 455/101 |
| 8,031,622 B2 * | 10/2011 | Padovani et al. | 370/252 |
| 8,036,710 B2 * | 10/2011 | Walton et al. | 455/562.1 |
| 8,055,313 B2 * | 11/2011 | Behzad et al. | 455/574 |
| 8,086,195 B2 * | 12/2011 | Thomas et al. | 455/132 |
| 8,254,861 B2 * | 8/2012 | Dominguez Romero et al. | 455/140 |

(Continued)

FOREIGN PATENT DOCUMENTS

| | | |
|---|---|---|
| EP | 0210792 | 2/1987 |
| GB | 2360911 | 10/2001 |
| WO | 0159945 | 8/2001 |

OTHER PUBLICATIONS

Heath et al. "Multimode Antenna Selection for Spatial Multiplexing Systems With Linear Receivers", IEEE Transactions on Signal Processing, vol. 53, No. 8, 2005 pp. 3042-3056.
Syed A. Mujtaba., U.S. Appl. No. 13/099,081, filed May 2, 2011.

*Primary Examiner* — Nathan Mitchell
(74) *Attorney, Agent, or Firm* — Treyz Law Group; G. Victor Treyz; Jason Tsai

(57) ABSTRACT

Electronic devices may be provided that contain wireless communication circuitry. The wireless communication circuitry may include radio-frequency transceiver circuitry coupled to multiple antennas. An electronic device may alternate between a sleep mode and a wake mode. During wake mode, the electronic device may monitor a paging channel in a wireless network for incoming paging signals. The device may use a selected one of the multiple antennas in monitoring the paging channel. If received signal quality is satisfactory, the device may maintain use of the selected one of the multiple antennas for subsequent wake period monitoring of the paging channel. If received signal quality falls below a threshold or is otherwise indicated to not be satisfactory, the device may switch to use of a different one of the multiple antennas in monitoring the paging channel. Other criteria may also be used in controlling the switching between antennas for paging channel monitoring.

18 Claims, 4 Drawing Sheets

U.S. PATENT DOCUMENTS

2008/0160992 A1    7/2008  Jalali
2008/0274725 A1*  11/2008  Tkachenko .................. 455/420
2010/0054166 A1    3/2010  Jung
2010/0093385 A1    4/2010  Kazmi et al.
2011/0019830 A1    1/2011  Leibman et al.

* cited by examiner

ELECTRONIC DEVICE WITH IDLE MODE ANTENNA SWITCHING

This relates generally to wireless communications circuitry, and more particularly, to electronic devices that have wireless communication circuitry with multiple antennas.

Electronic devices such as portable computers and cellular telephones are often provided with wireless communications capabilities. For example, electronic devices may use long-range wireless communication circuitry such as cellular telephone circuitry and WiMax (IEEE 802.16) circuitry. Electronic devices may also use short-range wireless communications circuitry such as WiFi® (IEEE 802.11) circuitry and Bluetooth® circuitry.

Antenna performance affects the ability of a user to take advantage of the wireless capabilities of an electronic device. If antenna performance is not satisfactory, calls may be dropped or data transfer rates may become undesirably slow. To ensure that antenna performance meets design criteria, it may sometimes be desirable to provide an electronic device with multiple antennas. In some situations, control circuitry within a device may be able to switch between antennas to ensure that an optimum antenna is being used to handle call traffic.

To conserve battery power, devices such as cellular telephones often support low power operating modes. For example, some cellular telephones support an idle mode that allows the cellular telephone circuitry to consume reduced amounts of power. In idle mode, the cellular telephone wireless circuitry alternates between sleep and wake states. While operating in the sleep state, wireless circuitry is inactivated so that the cellular telephone consumes a reduced amount of power. The sleep state typically lasts for a sleep period of about 640 ms to 5.1 s. When the sleep period is over, the wireless circuitry wakes up from the sleep state. The duration of the wake period is typically 100 ms. During the wake period, the wireless circuitry listens for incoming cellular telephone calls by monitoring a paging channel.

If, upon awakening, the cellular telephone is out of service, the cellular telephone may initiate a system search process to search for an available wireless network. If the cellular telephone is in service, but does not receive any paging signals during the wake period, the cellular telephone may return to the sleep state. If the cellular telephone detects incoming paging signals during the wake period, the cellular telephone can proceed with call setup operations to set up a communications link with the network and receive an incoming telephone call.

In devices such as cellular telephones with multiple antennas, the use of a single antenna to monitor the paging channel during idle mode operations may leave a device vulnerable to antenna disruptions. For example, if antenna performance is temporarily impaired due to the presence of an external object in the vicinity of the antenna, incoming paging signals and therefore incoming telephone calls may not be received.

It would therefore be desirable to be able to provide improved ways for electronic devices such as devices with multiple antennas to monitor paging signals during idle mode operations.

SUMMARY

Electronic devices may be provided that contain wireless communication circuitry. The wireless communication circuitry may include radio-frequency transceiver circuitry coupled to multiple antennas.

When awaiting wireless traffic such as incoming cellular telephone calls, an electronic device may alternate between a sleep state and a wake mode. During wake mode, the electronic device may monitor a paging channel in a wireless network for incoming paging signals. The device may use a selected one of the multiple antennas to monitor the paging channel during each sleep-wake cycle. For example, if the device has first and second antennas, the device may use the first antenna to monitor the paging channel in a first sleep-wake cycle. If suitable criteria are satisfied, the antenna that is used in monitoring the paging channel may be switched (e.g., to the second antenna).

Antenna switching decisions may be based on signal quality measurements. If received signal quality is satisfactory, the device may maintain use of the selected antenna for subsequent wake period monitoring of the paging channel. For example, the device may continue to use the first antenna in the next sleep-wake cycle. If received signal quality falls below a threshold or is otherwise indicated to not be satisfactory, the device may switch to use of a different one of the multiple antennas in monitoring the paging channel. The device may, as an example, switch from using the first antenna to using the second antenna for monitoring the paging channel.

Further features of the invention, its nature and various advantages will be more apparent from the accompanying drawings and the following detailed description of the preferred embodiments.

DETAILED DESCRIPTION

Electronic devices may be provided with wireless communication circuitry. The wireless communications circuitry may be used to support wireless communications in multiple wireless communication bands. The wireless communication circuitry may include multiple antennas arranged to implement an antenna diversity system.

The antennas can include loop antennas, inverted-F antennas, strip antennas, planar inverted-F antennas, slot antennas, hybrid antennas that include antenna structures of more than one type, or other suitable antennas. Conductive structures for the antennas may be formed from conductive electronic device structures such as conductive housing structures (e.g., a ground plane and part of a peripheral conductive housing member or other housing structures), traces on substrates such as traces on plastic, glass, or ceramic substrates, traces on flexible printed circuit boards ("flex circuits"), traces on rigid printed circuit boards (e.g., fiberglass-filled epoxy boards), sections of patterned metal foil, wires, strips of conductor, other conductive structures, or conductive structures that are formed from a combination of these structures.

Figure 1:
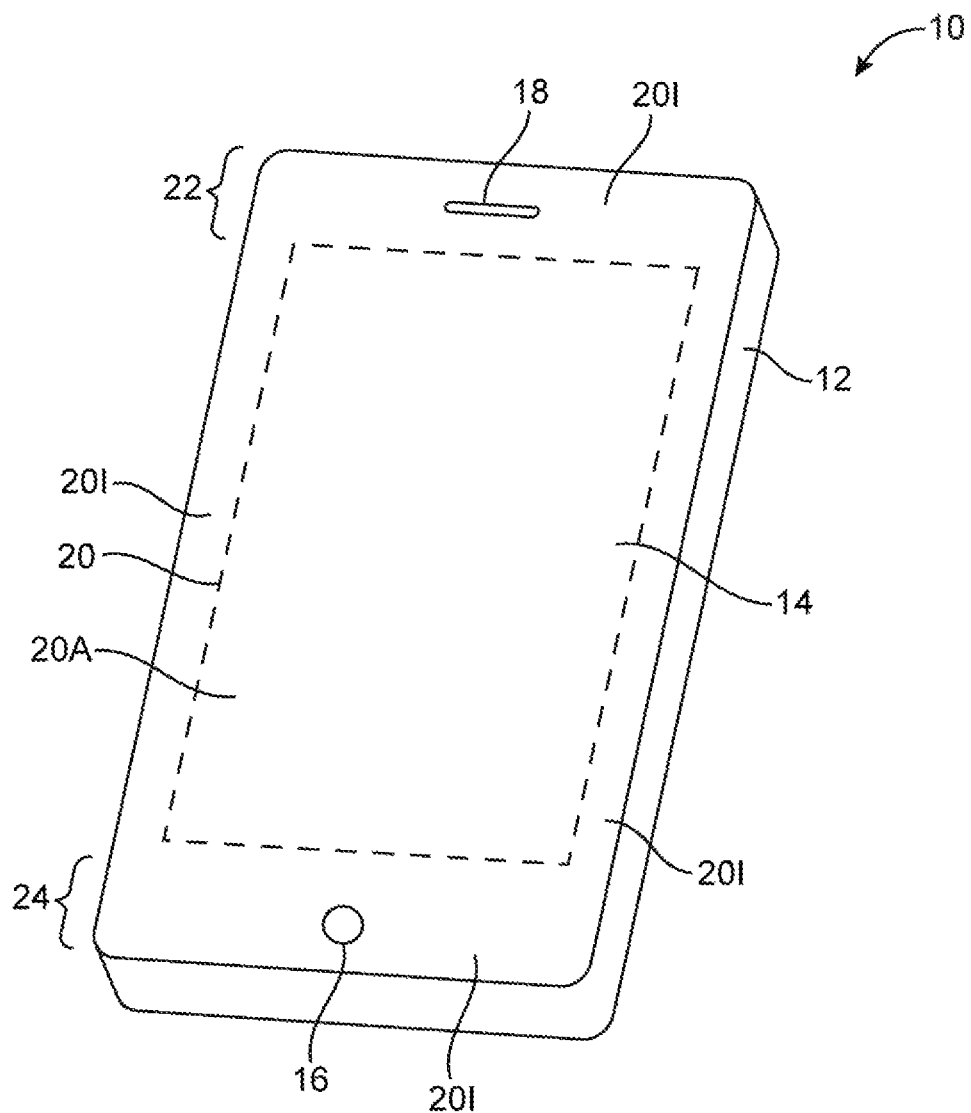
FIG. 1 is a perspective view of an illustrative electronic device with wireless communication circuitry having multiple antennas in accordance with an embodiment of the present invention.

An illustrative electronic device of the type that may be provided with one or more antennas (e.g., two antennas, three antennas, four antennas, five or more antennas, etc.) is shown in FIG. 1. Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, a media player, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electronic ink elements, liquid crystal display (LCD) components, or other suitable image pixel structures. A cover glass layer may cover the surface of display 14. Portions of display 14 such as peripheral regions 201 may be inactive and may be devoid of image pixel structures. Portions of display 14 such as rectangular central portion 20A (bounded by dashed line 20) may correspond to the active part of display 14. In active display region 20A, an array of image pixels may be used to display images for a user.

The cover glass layer that covers display 14 may have openings such as a circular opening for button 16 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

Housing 12 may include a peripheral conductive member such as a bezel or band of metal that runs around the rectangular outline of display 14 and device 10 (as an example). The peripheral conductive member may be used in forming the antennas of device 10 if desired.

Antennas may be located along the edges of device 10, on the rear or front of device 10, as extending elements or attachable structures, or elsewhere in device 10. With one suitable arrangement, which is sometimes described herein as an example, device 10 may be provided with one or more antennas at lower end 24 of housing 12 and one or more antennas at upper end 22 of housing 12. Locating antennas at opposing ends of device 10 (i.e., at the narrower end regions of display 14 and device 10 when device 10 has an elongated rectangular shape of the type shown in FIG. 1) may allow these antennas to be formed at an appropriate distance from ground structures that are associated with the conductive portions of display 14 (e.g., the pixel array and driver circuits in active region 20A of display 14).

If desired, a first cellular telephone antenna may be located in region 24 and a second cellular telephone antenna may be located in region 22. Antenna structures for handling satellite navigation signals such as Global Positioning System signals or wireless local area network signals such as IEEE 802.11 (WiFi®) signals or Bluetooth® signals may also be provided in regions 22 and/or 24 (either as separate additional antennas or as parts of the first and second cellular telephone antennas). Antenna structures may also be provided in regions 22 and/or 24 to handle WiMax (IEEE 802.16) signals.

In regions 22 and 24, openings may be formed between conductive housing structures and printed circuit boards and other conductive electrical components that make up device 10. These openings may be filled with air, plastic, or other dielectrics. Conductive housing structures and other conductive structures may serve as a ground plane for the antennas in device 10. The openings in regions 22 and 24 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element such as an inverted-F antenna resonating element formed from part of a conductive peripheral housing structure in device 10 from the ground plane, or may otherwise serve as part of antenna structures formed in regions 22 and 24.

Antennas may be formed in regions 22 and 24 that are identical (i.e., antennas may be formed in regions 22 and 24 that each cover the same set of cellular telephone bands or other communications bands of interest). Due to layout constraints or other design constraints, it may not be desirable to use identical antennas. Rather, it may be desirable to implement the antennas in regions 22 and 24 using different designs. For example, the first antenna in region 24 may cover all cellular telephone bands of interest (e.g., four or five bands) and the second antenna in region 22 may cover a subset of the four or five bands handled by the first antenna. Arrangements in which the antenna in region 24 handles a subset of the bands handled by the antenna in region 22 (or vice versa) may also be used. Tuning circuitry may be used to tune this type of antenna in real time to cover a either a first subset of bands or a second subset of bands and thereby cover all bands of interest.

Antenna operation can be disrupted when an antenna in device 10 is blocked by an external object such as a user's hand, when device 10 is placed near objects that interfere with proper antenna operation, or due to other factors (e.g., device orientation relative to its surroundings, etc.). To ensure that incoming signals such as paging signals associated with an incoming telephone call are properly received, even when one of the antennas in device 10 is blocked, device 10 can evaluate incoming signal quality for the antennas. Signal quality may be measured for received paging signals or other signals received from a wireless base station.

An antenna switching algorithm that runs on the circuitry of device 10 can be used to automatically switch between antennas based on the evaluated signal quality of received signals. The antenna switching algorithm may direct device 10 to select a new antenna for use in monitoring incoming paging signals when antenna performance on the currently used antenna has degraded or when other antenna switching criteria have been satisfied. With this type of arrangement, it is not necessary to simultaneously use multiple antennas and associated receiver circuits for monitoring incoming paging signals, thereby minimizing power consumption.

Arrangements in which device 10 has a primary antenna and a secondary antenna are sometimes described herein as an example. This is, however, merely illustrative. Device 10 may use three or more antennas if desired. Device 10 may use antennas that are substantially identical (e.g., in band coverage, in efficiency, etc.), or may use other types of antenna configurations.

Figure 2:
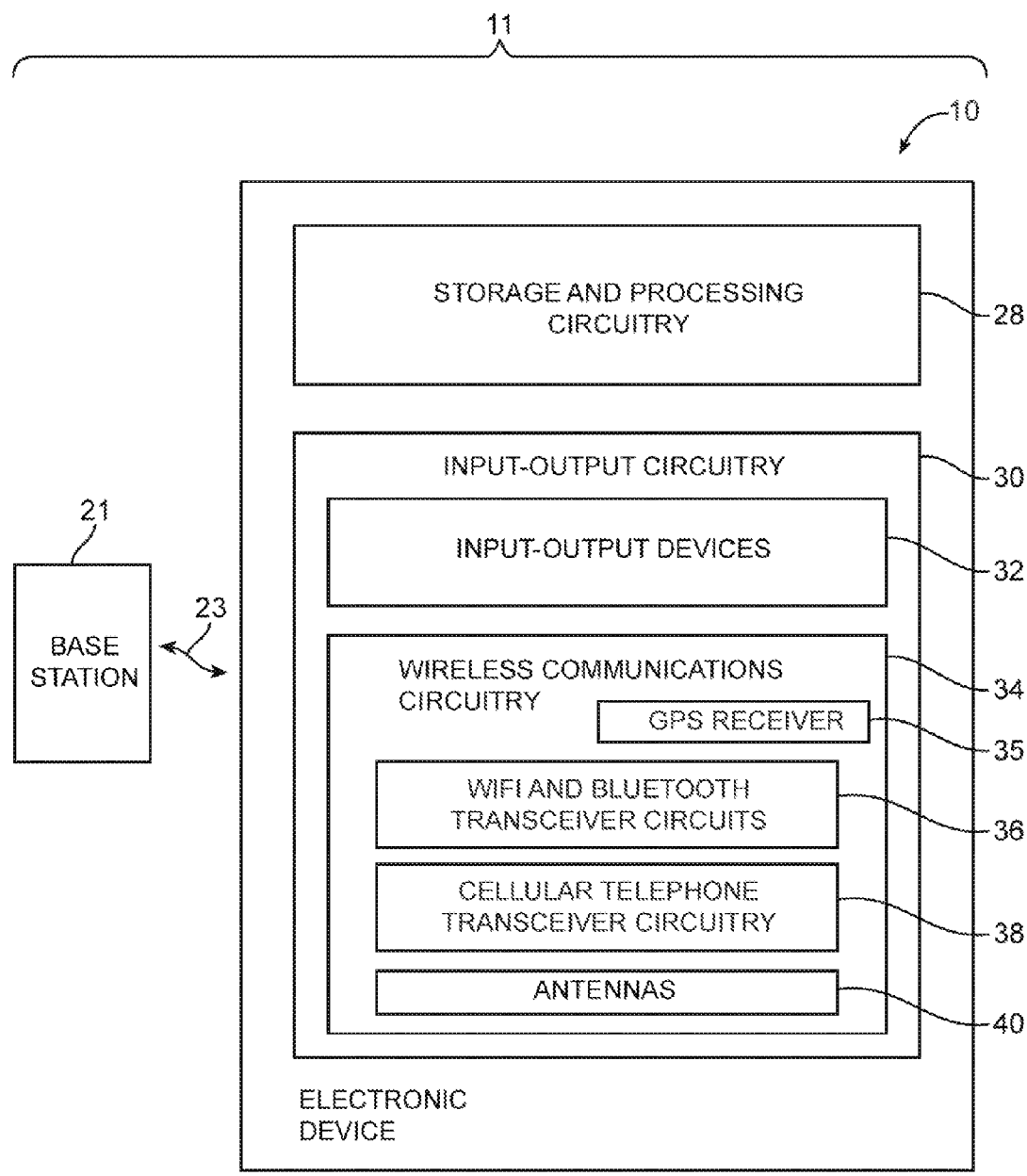
FIG. 2 is a schematic diagram of a wireless network including a base station and an illustrative electronic device with wireless communication circuitry having multiple antennas in accordance with an embodiment of the present invention.

A schematic diagram of a system in which electronic device 10 may operate is shown in FIG. 2. As shown in FIG. 2, system 11 may include wireless network equipment such as base station 21. Base stations such as base station 21 may be associated with a cellular telephone network or other wireless networking equipment. Device 10 may communicate with base station 21 over wireless link 23 (e.g., a cellular telephone link or other wireless communications link).

Device 10 may include control circuitry such as storage and processing circuitry 28. Storage and processing circuitry 28 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in storage and processing circuitry 28 and other control circuits such as control circuits in wireless communications circuitry 34 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment such as base station 21, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE802.16 (WiMax) protocols, cellular telephone protocols such as the Long Term Evolution (LTE) protocol, Global System for Mobile Communications (GSM) protocol, Code Division Multiple Access (CDMA) protocol, and Universal Mobile Telecommunications System (UMTS) protocol, etc.

Circuitry 28 may be configured to implement control algorithms that control the use of antennas in device 10. For example, circuitry 28 may configure wireless circuitry 34 to switch a particular antenna into use for transmitting and/or receiving signals. In some scenarios, circuitry 28 may be used in gathering sensor signals and signals that reflect the quality of received signals (e.g., received paging signals, received voice call traffic, received control channel signals, received data traffic, etc.). Examples of signal quality measurements that may be made in device 10 include bit error rate measurements, signal-to-noise ratio measurements, measurements on the amount of power associated with incoming wireless signals, channel quality measurements based on received signal strength indicator (RSSI) information (RSSI measurements), channel quality measurements based on received signal code power (RSCP) information (RSCP measurements), channel quality measurements based on signal-to-interference ratio (SINR) and signal-to-noise ratio (SNR) information (SINR and SNR measurements), channel quality measurements based on signal quality data such as Ec/Io or Ec/No data (Ec/Io and Ec/No measurements), etc. This information may be used in controlling which antenna is used. Antenna selections can also be made based on other criteria.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communication circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals.

Wireless communication circuitry 34 may include satellite navigation system receiver circuitry such as Global Positioning System (GPS) receiver circuitry 35 (e.g., for receiving satellite positioning signals at 1575 MHz). Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as bands at 850 MHz, 900 MHz, 1800 MHz, 1900 MHz, and 2100 MHz or other cellular telephone bands of interest. Wireless communication circuitry 34 can include circuitry for other short-range and long-range wireless links if desired (e.g., WiMax circuitry, etc.). Wireless communications circuitry 34 may, for example, include, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communication circuitry 34 may include antennas 40. Antennas 40 may be formed using any suitable types of antenna. For example, antennas 40 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link antenna. As described in connection with FIG. 1, there may be multiple cellular telephone antennas in device 10. For example, there may be one cellular telephone antenna in region 24 of device 10 and another cellular telephone antenna in region 22 of device 10. These antennas may be fixed or may be tunable.

Figure 3:
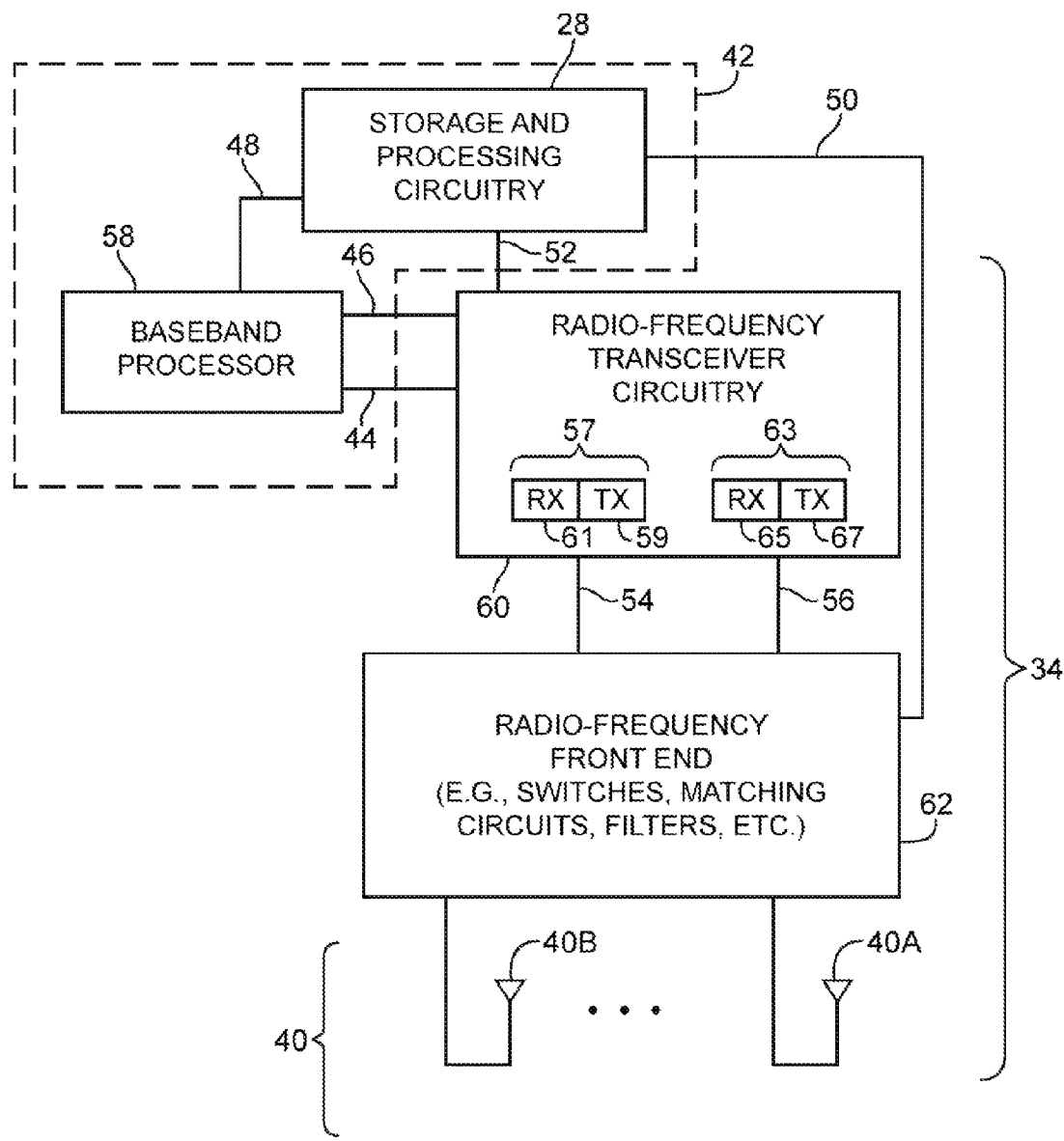
FIG. 3 is a diagram of illustrative wireless circuitry including multiple antennas and circuitry for controlling use of the antennas in accordance with an embodiment of the present invention.

Device 10 can be controlled by control circuitry that is configured to store and execute control code for implementing control algorithms (e.g., antenna diversity control algorithms and other wireless control algorithms). As shown in FIG. 3, control circuitry 42 may include storage and processing circuitry 28 (e.g., a microprocessor, memory circuits, etc.) and may include baseband processor 58. Baseband processor 58 may form part of wireless circuitry 34 and may include memory and processing circuits (i.e., baseband processor 58 may be considered to form part of the storage and processing circuitry of device 10).

Baseband processor 58 may provide data to storage and processing circuitry 28 via path 48. The data on path 48 may include raw and processed data associated with wireless (antenna) performance metrics for received signals such as received power, transmitted power, frame error rate, bit error rate, channel quality measurements based on received signal strength indicator (RSSI) information, channel quality measurements based on received signal code power (RSCP) information, channel quality measurements based on signal-to-interference ratio (SINR) and signal-to-noise ratio (SNR) information, channel quality measurements based on signal quality data such as Ec/Io or Ec/No data, information on whether responses (acknowledgements) are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, and other information that is reflective of the performance of wireless circuitry 34. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers such as transceivers 57 and 63 (e.g., one or more transceivers that are shared among antennas, one transceiver per antenna, etc.). In the illustrative configuration of FIG. 3, radio-frequency transceiver circuitry 60 has a first transceiver such as transceiver 57 that is associated with path (port) 54 (and which may be associated with path 44) and a second transceiver such as transceiver 63 that is associated with path (port) 56 (and which may be associated with path 46). Transceiver 57 may include a transmitter such as transmitter 59 and a receiver such as receiver 61 or may contain only a receiver (e.g., receiver 61) or only a transmitter (e.g., transmitter 59). Transceiver 63 may include a transmitter such as transmitter 67 and a receiver such as receiver 65 or may contain only a receiver (e.g., receiver 65) or only a transmitter (e.g., transmitter 59).

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by transmitters 59 and 67 to antennas 40.

Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60 such as receiver 61 at port 54 and receiver 63 at port 56, and paths such as paths 44 and 46. Baseband processor 58 may convert these received signals into digital data that is provided to storage and processing circuitry 28. Baseband processor 58 may also extract information from received signals that is indicative of signal quality for the channel to which the transceiver is currently tuned. For example, baseband processor and/or other circuitry in control circuitry 42 may analyze received signals to produce bit error rate measurements, measurements on the amount of power associated with incoming wireless signals, strength indicator (RSSI) information, received signal code power (RSCP) information, signal-to-interference ratio (SINR) information, signal-to-noise ratio (SNR) information, channel quality measurements based on signal quality data such as Ec/Io or Ec/No data, etc. This information may be used in controlling which antenna(s) to use in device 10. For example, a control algorithm running on control circuitry 42 may be used to switch a particular antenna into use based on channel quality measurements such as these.

Radio-frequency front end 62 may include a switch that is used to connect transceiver 57 to antenna 40B and transceiver 63 to antenna 40A or vice versa. The switch may be configured by control signals received from control circuitry 42 over path 50. Circuitry 42 may, for example, adjust the switch to select which antenna is being used to transmit radio-frequency signals (e.g., when it is desired to share a single transmitter in transceiver 60 between two antennas) or which antenna is being used to receive radio-frequency signals (e.g., when it is desired to share a single receiver between two antennas).

If desired, antenna selection may be made by selectively activating and deactivating transceivers without using a switch in front end 62. For example, if it is desired to use antenna 40B, transceiver 57 (which may be coupled to antenna 40B through circuitry 62) may be activated and transceiver 63 (which may be coupled to antenna 40A through circuitry 62) may be deactivated. If it is desired to use antenna 40A, circuitry 42 may activate transceiver 63 and deactivate transceiver 57. Combinations of these approaches may also be used to select which antennas are being used to transmit and/or receive signals.

Control operations such as operations associated with configuring wireless circuitry 34 to transmit or receive radio-frequency signals through a desired one of antennas 40 may be performed using a control algorithm that is implemented on control circuitry 42 (e.g., using the control circuitry and memory resources of storage and processing circuitry 28 and baseband processor 58).

There is typically a paging channel associated with each communications band in network 11 (FIG. 2). When an incoming call is being made to device 10 (sometimes referred to as a mobile station), network 11 may send a paging signal on the paging channel to device 10 from base station 21. The transmission of the paging signal alerts device 10 to the presence of the incoming call and directs device 10 to establish a wireless communications link with base station 21 (i.e., link 23 of FIG. 2) for handling the traffic associated with the call.

To conserve battery power, device 10 may be operated in a low-power idle mode when not in active use for a telephone call. In idle mode, wireless circuitry 34 of device 10 may alternate between sleep and wake states. While operating in the sleep state, device 10 may inactivate wireless circuitry such as radio-frequency transceiver circuitry 60 so that device 10 consumes a reduced amount of power. The sleep state may last for a sleep period of about 640 ms to 5.1 s or other suitable duration. When the sleep period is over, wireless circuitry 34 wakes up from the sleep state. The duration of the wake period may be about 100 ms (as an example). During the wake period, radio-frequency transceiver circuitry 60 is active, so that wireless circuitry 34 can listen for incoming cellular telephone calls by monitoring a paging channel.

If, upon awakening, device 10 is out of service, the device 10 may initiate a system search process to search for an available wireless network. If device 10 is in service, but does not receive any paging signals during the wake period, device 10 may return to the sleep state. If device 10 detects incoming paging signals during the wake period, device 10 can proceed with call setup operations to set up communications link 23 with base station 21 and receive an incoming telephone call or other data from the network.

Because device 10 has multiple antennas 40, device 10 may, if desired, simultaneously use multiple antennas in listening for paging signals during each wake period. Power consumption can be minimized by using fewer than all of the available antennas in device 10 during these listening operations. For example, if device 10 has two antennas, power consumption can be minimized by using only one of the two antennas to monitor the paging channel for incoming paging signals during any given wake period. Transceiver circuitry associated with the unused antenna can be deactivated.

If the same antenna is used to monitor the paging channel during each wakeup period, device 10 may be vulnerable to antenna disruptions. For example, if device 10 is using only antenna 40A to monitor the paging channel for paging signals and antenna performance for antenna 40A is temporarily impaired due to the presence of an external object in the vicinity of antenna 40A, incoming paging signals and therefore incoming telephone calls may not be received by device 10. To avoid this possibility, device 10 may use an idle mode antenna selection algorithm that intelligently selects between multiple antennas when monitoring the paging channel. In some circumstances, such as situations in which signal quality on the current antenna is high, device 10 may use the same antenna over multiple idle mode sleep/wake cycles without change. In other circumstances, such as when the quality of received signals through the current is low, device 10 can switch to the use of an alternate antenna.

Figure 4:
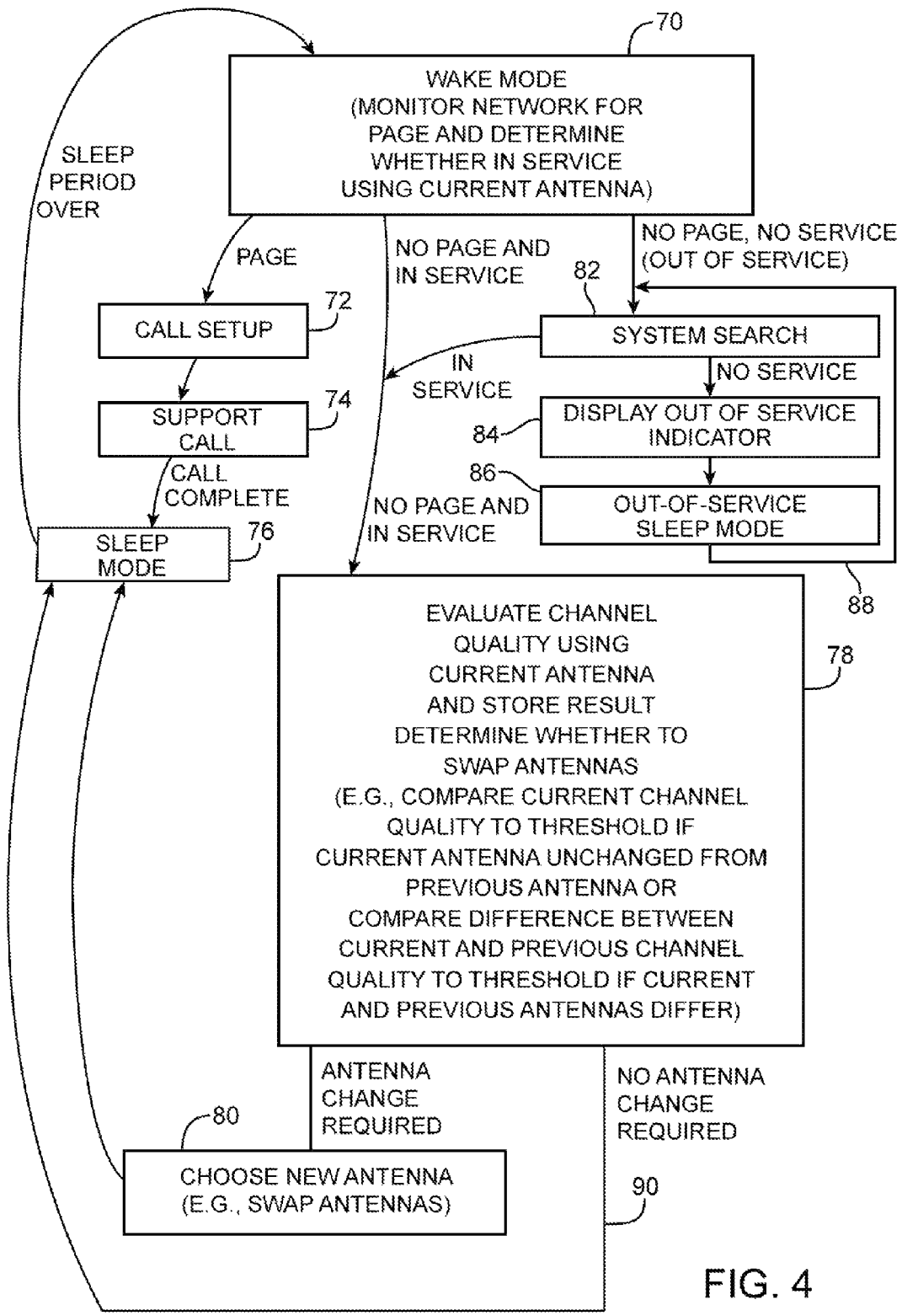
FIG. 4 is a flow chart of illustrative operations involved in using an electronic device with multiple antennas to monitor a paging channel for incoming paging signals in accordance with an embodiment of the present invention.

FIG. 4 is a flow chart of illustrative steps involved in using an idle mode antenna selection algorithm running on control circuitry 42 of device 10 to intelligently select which antenna is to be used in monitoring a paging channel for paging signals.

When not actively handling a call, wireless circuitry 34 may be operated in a sleep mode (step 76). In the sleep mode, unneeded wireless circuits such as radio-frequency transceiver circuitry 60 may be temporarily inactivated (e.g., fully or partly powered down) to reduce power consumption. A timer in control circuitry 42 may be used to measure the amount of time that device 10 remains in the sleep mode (sometimes referred to as the sleep period). The length of the sleep period may be, for example, 640 ms to 5.1 s (as an example).

Following expiration of the sleep period, wireless circuitry 34 may be awoken and operated in wake mode (step 70). For example, radio-frequency transceiver 60 may be activated and tuned to a paging channel in network 11. Radio-frequency front-end circuitry 62 and radio-frequency transceiver circuitry 60 may be adjusted so that a selected one of antennas 40 is used in receiving signals on the paging channel. For example, in a configuration in which radio-frequency transceiver circuitry 60 includes a first receiver such as receiver 61 and a second receiver such as receiver 65, control signals on path 52 may be used to activate a given one of these two receivers while deactivating the other. The antenna that is coupled to the active receiver (e.g., antenna 40A) will therefore be used in monitoring the paging channel for paging signals whereas the antenna that is coupled to the inactive receiver (e.g., antenna 40B) will not be used. In addition to monitoring the paging channel, wireless circuitry 34 may use the current antenna in determining whether signal traffic is present that indicates that device 10 is in service.

If a paging signal is detected on the paging channel, device 10 can perform call setup operations (step 72) by wirelessly interacting with base station 21 to set up wireless communication link 23. Link 23 may then be used to carry traffic associated with a cellular telephone call (step 74). During a telephone call, device 10 may use wireless circuitry 34 to transmit outgoing call traffic to base station 21 over link 23 and base station 21 can transmit incoming call traffic to wireless circuitry 34 over link 23.

Once the call is complete, device 10 can place wireless circuitry 34 in sleep mode 76. In particular, device 10 can inactivate wireless circuitry such as radio-frequency transceiver circuitry 60 (FIG. 3). Control circuitry 42 may maintain wireless circuitry 34 in the sleep mode for a sleep period of 640 ms to 5.1 s or other suitable time period. Once the sleep period has expired, device 10 can awaken wireless circuitry 34 (e.g., by activating radio-frequency transceiver circuitry 60) for a wake period (e.g., a wake period of 100 ms or other suitable duration).

While in wake mode, device 10 can use radio-frequency transceiver circuitry 60 (e.g., an active receiver in circuitry 60) and can use the current antenna (i.e., the antenna that is connected to the activated receiver or that is otherwise currently switched into use) to monitor the paging channel for incoming paging signals and can monitor network 11 for incoming wireless network signals indicating that device 10 is in service.

In response to determining that device 10 is in service and is receiving a paging signal, device 10 can perform call setup operations (step 72), can be used to support a voice call (step 74), and can return to sleep mode 76 following completion of the voice call.

In response to determining that device 10 is not receiving a paging signal and is not in service, device 10 can search for an available wireless network (step 82). When performing wireless network searching during step 82, device 10 is sometimes referred to as performing a "system search" in the context of networks such as CDMA networks and is sometimes referred to as performing a "public land mobile network search" in the context of networks such as UMTS networks.

If the search for an available wireless network that is performed during the operations of step 82 does not reveal any available networks, device 10 is out of service and may display an out-of-service indicator on display 14 (step 84). Device 10 may then, at step 86, enter a deep sleep mode (sometimes referred to as out-of-service sleep) in which unneeded wireless circuitry 34 (e.g., transceiver circuitry 60) is inactivated. The out-of-service sleep period may be different than the sleep period used for sleep mode 76 (e.g., the out-of-service sleep period may be longer and/or may involve deactivating more circuitry).

Periodically, device 10 can awaken circuitry 34 from out-of-service sleep mode 86 and can perform a new system search, as indicated by line 88.

When the system search of step 82 is successful and an available wireless network has been located, device 10 is in service. In response to detection of an available network during the operations of step 82 or when the wake period monitoring operations of step 70 reveal that device 10 is not receiving any paging signals and is in service, device operations may proceed to step 78.

At step 78, device 10 can evaluate the quality of incoming signals. In particular, device 10 may use control circuitry 42 (e.g., baseband processor 58) to evaluate the quality γ of the incoming paging signal on the paging channel or other incoming signals that are being received by device 10. These signal quality measurements (i.e., the value of γ), which may sometimes be referred to as channel quality measurements, may include bit error rate measurements, measurements on the amount of power associated with incoming wireless signals, strength indicator (RSSI) information, received signal code power (RSCP) information, signal-to-interference ratio (SINR) information, signal-to-noise ratio (SNR) information, channel quality measurements based on signal quality data such as Ec/Io or Ec/No data, or other suitable performance metrics that are indicative of the performance of device 10 in receiving wireless signals with its currently selected antenna.

Device 10 may use control circuitry 42 to run a control algorithm that determines in real time whether or not to switch a new antenna into use in place of the current antenna. If, for example, there are two available antennas 40 in device 10 such as antennas 40A and 40B of FIG. 3, and if antenna 40A is used as the current antenna during the operations of step 70, device 10 can determine, during the evaluation operations of step 78, whether or not antenna 40A should be retained as the current antenna or whether antenna 40B should be switched into use in place of antenna 40A. Likewise, if antenna 40B was used during the operations of step 70, the evaluation operations of step 78 may be used to determine whether device 10 should retain antenna 40B as the current antenna or whether device 10 should adjust transceiver circuitry 60 and/or front end circuitry 62 to switch antenna 40A into use as the current antenna for subsequent paging channel monitoring operations.

In performing the operations of step 78, device 10 may use signal quality measurements that were obtained during step 70 (i.e., signal quality measurements for the current sleep-wake cycle that have been obtained using the current antenna). Device 10 may also use signal quality measurements that were obtained during earlier wake periods (i.e., measurements from step 70 in the previous sleep-wake cycle that have been retained in storage). The antenna that was used in making signal quality measurements during the previous sleep-wake cycle (sometimes referred to as the previous antenna) may or may not be the same antenna that is currently being used (i.e., the previous antenna may or may not be the same as the current antenna).

Antennas 40 may or may not all be identical. If desired, operation with one antenna may be generally preferred over another. For example, one antenna may be located in a portion of device 10 such as region 24 where the antenna is typically located farther from external objects such as the human body and may be constructed with a more efficient design that an antenna located in another portions of device 10 such as region 22. With this type of arrangement, the preferred antenna may sometimes be referred to as a primary antenna and the alternate antenna may sometimes be referred to as the secondary antenna. In device 10, for example, antenna 40A may be the primary antenna and antenna 40B may be the secondary antenna or vice versa.

During the operations of step 78, device 10 may evaluate whether or not to swap primary and secondary antenna assignments. Signal quality measurements for the current antenna, signal quality measurements for the previous antenna, threshold values, and other information may be used in determining whether or not to swap antennas. If desired, the criteria used in determining whether or not to swap antennas may be different depending on whether the current antenna is the primary antenna or the secondary antenna and whether the previous antenna is the primary antenna or the secondary antenna.

In a first possible device configuration, the current antenna is the primary antenna and the previous antenna is the primary antenna. The primary antenna may generally exhibit satisfactory performance. It may therefore be desirable to retain usage of the primary antenna, provided that the primary antenna is consistently performing adequately. During the operations of step 78, device 10 may measure signal quality γ for the current antenna (i.e., the primary antenna) and may compare the value of γ to a first predetermined signal quality threshold. Provided that γ for the primary antenna exceeds the first threshold and the previous antenna is the primary antenna (i.e., the antennas have not be switched within the last sleep-wake cycle), no antenna change is needed. Device 10 may therefore retain usage of the primary antenna as the current antenna and may place wireless circuitry 34 in sleep mode 76, as indicated by line 90. If γ for the primary antenna is less than the first threshold and the previous antenna was the primary antenna, device 10 can swap the secondary antenna into use for the next sleep-wake cycle in place of the primary antenna (step 80).

In a second possible device configuration, the current antenna is the primary antenna and the previous antenna is the secondary antenna. In this configuration, device 10 may make a comparative measurement of antenna performance using signal quality measurements from both the current and previous sleep-wake cycles. For example, device 10 can measure the performance of the current (primary) antenna and can determine whether its performance (γ value) exceeds that of the previous (secondary) antenna by more than a second predetermined threshold amount. If so, device 10 can retain usage of the primary antenna as the current antenna and may place wireless circuitry in sleep mode 76, as indicated by line 90. If the signal quality for the current antenna does not exceed the signal quality for the previous antenna by more than the second threshold, device 10 can swap the secondary antenna into use in place of the primary antenna (step 80).

In a third possible configuration, the current antenna is the secondary antenna and the previous antenna is the primary antenna. In this configuration, a comparative measurement may be made in which the performance of the current (secondary) antenna (i.e., signal quality γ) is compared to that of the previous (primary) antenna. If the performance of the current antenna exceeds the performance of the previous antenna by more than a third predetermined threshold amount, device 10 can maintain the current antenna assignment and can place the wireless circuitry in sleep mode 76, as shown by line 90. If the performance of the current antenna does not exceed the signal quality for the previous antenna by more than the third threshold, device 10 may swap the primary antenna in to use in place of the secondary antenna.

In a fourth possible configuration, the current antenna is the secondary antenna and the previous antenna is the secondary antenna. When configured in this way, device 10 may determine whether the performance of the current (secondary) antenna is greater than a fourth threshold amount. If the performance (signal quality γ) of the current antenna exceeds the fourth threshold, no antenna change is needed. Device 10 may therefore retain usage of the secondary antenna as the current antenna and may place wireless circuitry 34 in sleep mode 76, as indicated by line 90. If the signal quality associated with the current (secondary) antenna is less than the fourth threshold, device 10 can swap the primary antenna into use for the next sleep-wake cycle in place of the secondary antenna (step 80).

The first, second, third, and fourth thresholds may all be different or two or more of these thresholds may be the same. For example, the first and fourth thresholds may be the same and/or the second and third thresholds may be the same (as examples).

In device configurations with more than two antennas, the antennas may be organized in sets of multiple antennas. For example, in a scenario in which device 10 includes four antennas 40, the antennas may be organized into a first set of two antennas and a second set of two antennas. In a scenario in which device 10 includes three antennas, the antennas may be organized into a first set of two antennas and a second antenna set that includes one antenna. Device configurations with five or more antennas can be handled similarly (e.g., a first set of antennas may include three antennas and a second set of antenna may include two antennas, etc.).

During the operations of FIG. 4, radio-frequency transceiver circuitry 60 may monitor the wireless network for paging signals during the wake mode using a selected one of the first and second sets of antennas. For example, if there are four antennas in device 10, the wireless network may be monitored using two of the four antennas. The control circuitry in device 10 may be configured to make signal quality measurements (step 78 of FIG. 4) on signals received with the selected one of the sets of antennas. The control circuitry may also be configured to switch which of the first and second sets of antennas is used to monitor the wireless network for paging signals during a subsequent wake mode based at least partly on the signal quality measurements. If necessary, device 10 can swap which of the sets of antenna is used as the current antenna set during the operations of step 80 (FIG. 4). Arrangements in which device 10 selects between sets of multiple antennas will generally help to conserve power relative to arrangements in which all antennas (e.g., all four antennas) are used at all times while improving paging performance over schemes that use only a single antenna for page monitoring.

The foregoing is merely illustrative of the principles of this invention and various modifications can be made by those skilled in the art without departing from the scope and spirit of the invention.

What is claimed is:

1. A method for using an electronic device that has at least first and second antennas to monitor a wireless network for incoming paging signals, wherein the electronic device further includes control circuitry and wireless circuitry that is operable in alternating sleep and wake modes, the method comprising:
    using a selected one of the first and second antennas as a current antenna to monitor a paging channel for incoming paging signals;
    during a current one of the wake modes, obtaining a current antenna received signal quality measurement using the current antenna;
    during a previous wake mode, obtaining a previous antenna received signal quality measurement using a selected one of the first and second antennas that served as a previous antenna that was used in monitoring the paging channel for incoming signals;
    with the control circuitry and the wireless circuitry, evaluating at least the current antenna received signal quality measurement to determine whether to switch from use of the current antenna to a different antenna in monitoring the paging channels for incoming paging signals, wherein evaluating at least the current antenna received signal quality measurement comprises:
        when the current antenna is unchanged from the previous antenna, comparing the current received signal quality measurement to a first predetermined threshold; and
        when the current antenna differs from the previous antenna, computing a difference between the current antenna received signal quality measurement and the previous antenna received signal quality measurement and comparing the difference to a second predetermined threshold.

2. The method defined in claim 1 further comprising:
    in response to determining that the current antenna received signal quality measurement exceeds the first predetermined threshold, using the control circuitry and wireless circuitry to maintain use of the current antenna for monitoring the paging channel for incoming paging signals.

3. The method defined in claim 1 further comprising:
    in response to determining that the current antenna received signal quality measurement is less than the first predetermined threshold, swapping which of the first and second antennas is used as the current antenna for monitoring the paging channel for incoming paging signals.

4. A method for monitoring a paging channel for paging signals with an electronic device, comprising:
    operating the electronic device in alternating sleep and wake modes;
    during a wake mode period, monitoring the paging channel for incoming paging signals using a selected one of multiple antennas; and
    evaluating whether to switch the selected antenna to a different one of the multiple antennas to monitor the paging channel by obtaining received signal quality information with the selected antenna without switching antennas other than the selected antenna into use during that wake mode period.

5. The method defined in claim 4 wherein evaluating whether to switch the selected antenna comprises comparing signal quality information gathered using the selected antenna to a threshold.

6. The method defined in claim 4 wherein evaluating whether to switch the selected antenna comprises comparing signal quality information gathered using the selected antenna to signal quality information gathered using a different one of the multiple antennas.

7. The method defined in claim 4 wherein evaluating whether to switch the selected antenna comprises comparing signal quality information gathered using the selected antenna during the wake mode period to signal quality information gathered using a different one of the multiple antennas during another wake mode period.

8. The method defined in claim 7 wherein the wake mode period comprises a current wake mode period and wherein the another wake mode period comprises a previous wake mode period.

9. The method defined in claim 8 wherein the previous wake mode period is associated with a sleep-wake cycle immediately preceding a sleep-wake cycle that includes the current wake mode period and a current sleep mode period.

10. The method defined in claim 4 wherein evaluating whether to switch the selected antenna comprises evaluating signal quality measurements selected from the group consisting of: bit error rate measurements, signal-to-noise ratio measurements, received power measurements, on received signal strength indicator measurements, received signal code power measurements, signal-to-interference ratio measurements, signal-to-noise ratio measurements, Ec/Io measurements, and Ec/No measurements.

11. The method defined in claim 4 further comprising:
in response to determining that received signal quality using the selected antenna is satisfactory, maintaining use of the selected antenna to monitor the paging channel without switching the selected antenna to a different one of the multiple antennas.

12. The method defined in claim 11 wherein the multiple antennas are located at opposing ends of the electronic device and include a primary antenna and a secondary antenna and wherein maintaining use of the selected antenna comprises maintaining use of the primary antenna.

13. The method defined in claim 4 further comprising:
in response to determining that received signal quality currently measured using the selected antenna does not exceed received signal quality measured previously using a different one of the antennas by more than a predetermined threshold amount, switching from the selected antenna to the different one of the antennas and monitoring the paging channel for incoming paging signals using the different one of the antennas.

14. An electronic device configured to communicate with a wireless network, comprising:
at least first and second antennas;
radio-frequency transceiver circuitry coupled to the first and second antennas; and
control circuitry configured to direct the radio-frequency transceiver circuitry to alternately operate in a sleep mode and a wake mode having a wake mode period, wherein the radio-frequency transceiver circuitry does not monitor the wireless network for paging signals during the sleep mode, wherein the radio-frequency transceiver circuitry monitors the wireless network for paging signals during the wake mode period using a selected one of the first and second antennas, wherein the control circuitry is configured to make signal quality measurements on signals received with the selected one of the antennas in response to detection of no paging signals when monitoring the wireless network for paging signals during the wake mode period, wherein the electronic device performs call setup operations without performing any signal quality measurements in response to detection of paging signals when monitoring the wireless network for paging signals during the wake mode period, and wherein the control circuitry is configured to switch which of the first and second antennas is used to monitor the wireless network for paging signals during a subsequent wake mode based at least partly on the signal quality measurements.

15. The electronic device defined in claim 14 wherein the radio-frequency transceiver circuitry comprises a first receiver coupled to the first antenna and a second receiver coupled to the second antenna and wherein the control circuitry is configured to selectively activate and deactivate the first and second receivers based at least partly on the signal quality measurements.

16. The electronic device defined in claim 14 wherein the electronic device has a rectangular housing with opposing ends, wherein the first antenna is located at a first of the ends, and wherein the second antenna is located at a second of the ends.

17. The electronic device defined in claim 14 wherein the radio-frequency transceiver circuitry comprises cellular telephone transceiver circuitry and wherein the electronic device comprises a handheld electronic device.

18. The electronic device defined in claim 14 a first set of multiple antennas that includes the first antenna and a second set of multiple antennas that includes the second antenna, wherein the radio-frequency transceiver circuitry monitors the wireless network for paging signals during the wake mode period using a selected one of the first and second sets of antennas, wherein the control circuitry is configured to make signal quality measurements on signals received with the selected one of the sets of antennas, and wherein the control circuitry is configured to switch which of the first and second sets of antennas is used to monitor the wireless network for paging signals during a subsequent wake mode period based at least partly on the signal quality measurements.

* * * * *